United States Patent
Ma et al.

(10) Patent No.: US 11,715,242 B2
(45) Date of Patent: *Aug. 1, 2023

(54) SYNTHESIZING CLOUD STICKERS

(71) Applicant: Snap Inc., Santa Monica, CA (US)

(72) Inventors: Chongyang Ma, Los Angeles, CA (US); Xing Mei, Los Angeles, CA (US); Nan Hu, San Jose, CA (US); Kirk Ouimet, Orem, UT (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,139

(22) Filed: Sep. 20, 2021

(65) Prior Publication Data

US 2022/0076457 A1 Mar. 10, 2022

Related U.S. Application Data

(63) Continuation of application No. 17/004,722, filed on Aug. 27, 2020, now Pat. No. 11,151,756, which is a continuation of application No. 16/738,712, filed on Jan. 9, 2020, now Pat. No. 10,789,736, which is a continuation of application No. 15/820,090, filed on Nov. 21, 2017, now Pat. No. 10,565,743.

(51) Int. Cl.
| | |
|---|---|
| *G06T 11/00* | (2006.01) |
| *G06T 7/11* | (2017.01) |
| *H04L 51/10* | (2022.01) |
| *G06T 5/00* | (2006.01) |
| *G06T 11/60* | (2006.01) |
| *G06T 7/277* | (2017.01) |

(52) U.S. Cl.
CPC ............ *G06T 11/001* (2013.01); *G06T 5/002* (2013.01); *G06T 7/11* (2017.01); *G06T 7/277* (2017.01); *G06T 11/60* (2013.01); *H04L 51/10* (2013.01)

(58) Field of Classification Search
None
See application file for complete search history.

(56) References Cited

U.S. PATENT DOCUMENTS

| | | |
|---|---|---|
| 9,329,762 B1 | 5/2016 | Schultz et al. |
| 10,565,743 B1 | 2/2020 | Ma et al. |
| 10,789,736 B1 | 9/2020 | Ma et al. |
| 11,151,756 B2 | 10/2021 | Ma et al. |
| 2005/0024376 A1 | 2/2005 | Gettman et al. |

(Continued)

OTHER PUBLICATIONS

U.S. Appl. No. 15/820,090 U.S. Pat. No. 10,565,743, filed Nov. 21, 2017, Synthesizing Cloud Stickers.

(Continued)

*Primary Examiner* — Peter Hoang
(74) *Attorney, Agent, or Firm* — Schwegman Lundberg & Woessner, P.A.

(57) ABSTRACT

Disclosed are systems, methods, and computer-readable storage media to modify image content. One aspect includes identifying, by one or more electronic hardware processors, an image and content within the image, determining, by the one or more electronic hardware processors, a sky region of the image, determining, by the one or more electronic hardware processors, whether the content within the image is located within the sky region of the image, and in response to the content being within the sky region of the image, modifying, by the one or more electronic hardware processors, the content based on fractal Brownian motion.

20 Claims, 15 Drawing Sheets

(56) References Cited

U.S. PATENT DOCUMENTS

| | | |
|---|---|---|
| 2013/0169629 A1 | 7/2013 | Shin et al. |
| 2015/0178946 A1 | 6/2015 | Krishnaswamy et al. |
| 2015/0242442 A1 | 8/2015 | Sohn et al. |
| 2017/0192651 A1 | 7/2017 | Yang et al. |
| 2017/0236287 A1 | 8/2017 | Shen et al. |
| 2017/0278289 A1 | 9/2017 | Marino et al. |
| 2018/0012392 A1 | 1/2018 | Kryachko |
| 2018/0089899 A1 | 3/2018 | Piemonte et al. |
| 2020/0394826 A1 | 12/2020 | Ma et al. |

OTHER PUBLICATIONS

U.S. Appl. No. 16/738,712 U.S. Pat. No. 10,789,736, filed Jan. 9, 2020, Synthesizing Cloud Stickers.

U.S. Appl. No. 17/004,722, filed Aug. 27, 2020, Synthesizing Cloud Stickers.

"U.S. Appl. No. 15/820,090, Non Final Office Action dated Apr. 16, 2019", 9 pgs.

"U.S. Appl. No. 15/820,090, Notice of Allowance dated Oct. 9, 2019", 8 pgs.

"U.S. Appl. No. 15/820,090, Response filed Jun. 24, 2019 to Non Final Office Action dated Apr. 16, 2019", 9 pgs.

"U.S. Appl. No. 16/738,712, Non Final Office Action dated Feb. 20, 2020", 7 pgs.

"U.S. Appl. No. 16/738,712, Notice of Allowance dated May 29, 2020", 7 pgs.

"U.S. Appl. No. 16/738,712, Response filed May 1, 2020 to Non Final Office Action dated Feb. 20, 2020", 7 pgs.

"U.S. Appl. No. 17/004,722, Final Office Action dated Apr. 9, 2021", 14 pgs.

"U.S. Appl. No. 17/004,722, Non Final Office Action dated Oct. 1, 2020", 16 pgs.

"U.S. Appl. No. 17/004,722, Notice of Allowance dated Jun. 18, 2021", 8 pgs.

"U.S. Appl. No. 17/004,722, Response filed Jun. 9, 2021 to Final Office Action dated Apr. 9, 2021", 9 pgs.

"U.S. Appl. No. 17/004,722, Response filed Dec. 29, 2020 to Non Final Office Action dated Oct. 1, 2020", 12 pgs.

Gonzalez, Patricio, et al., "The Book of Shaders", (2015), 5 pgs.

SYNTHESIZING CLOUD STICKERS

CLAIM OF PRIORITY

This application is a continuation of and claims the benefit of priority to U.S. patent application Ser. No. 17/004,722, filed on Aug. 27, 2020, which is a continuation of and claims the benefit of priority to U.S. patent application Ser. No. 16/738,712, filed on Jan. 9, 2020, which is a continuation of and claims the benefit of priority to U.S. patent application Ser. No. 15/820,090, filed on Nov. 21, 2017, each of which are hereby incorporated by reference herein in their entireties.

TECHNICAL FIELD

The present disclosure generally relates to enhancing images within a social network. More specifically, the present disclosure provides for improved methods of personalization of images.

BACKGROUND

Social networks provide a variety of creative features to their users. For example, social networks may allow users to capture images and personalize the images in a variety of ways. For example, users may be able to add content to their captured images. The added content may include location specific or user specific content. By allowing users to personalize their images, the social network provides a mechanism for users to express themselves to others. The ability to express oneself in new and creative ways is an important feature in retaining social network users. Therefore, improved methods and devices to facilitate creative expression of social network users are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Some of the disclosed embodiments provide for automatic modification of content placed, typically by a user, in a sky region of an image. The content may be modified to include a cloud texture in some aspects. Content placed outside the sky region may not be so modified. In some aspects, the content may include a sticker. Stickers may include emoji's or other graphical resources that may add a creative or communicative message to an image. In some aspects, the content may be modified to include a cloud-like texture via the use of fractal Brownian motion. The content may first be converted into a grayscale image. The content may then be blurred to remove sharp edges. After the cloud-like texture is generated, it may be combined with the blurred version of the content, for example, by multiplying pixel values in the blurred image with corresponding pixel values in the cloud-like texture.

In some other aspects, content may be modified to have other characteristics based on other regions in which the content is located. For example, in some aspects, the disclosed embodiments may detect other types of regions than sky regions, such as water regions, ground regions, or other regions. In some aspects, content placed in the identified region may be modified in a particular manner based on the type of region in which the content is placed. For example, in some aspects, content placed in a water region may be modified to have a texture similar to a fish, such as a scaly texture. In some other aspects, content placed in a region identified as a ground region may be modified to have a texture resembling rock or gravel.

Figure 1:
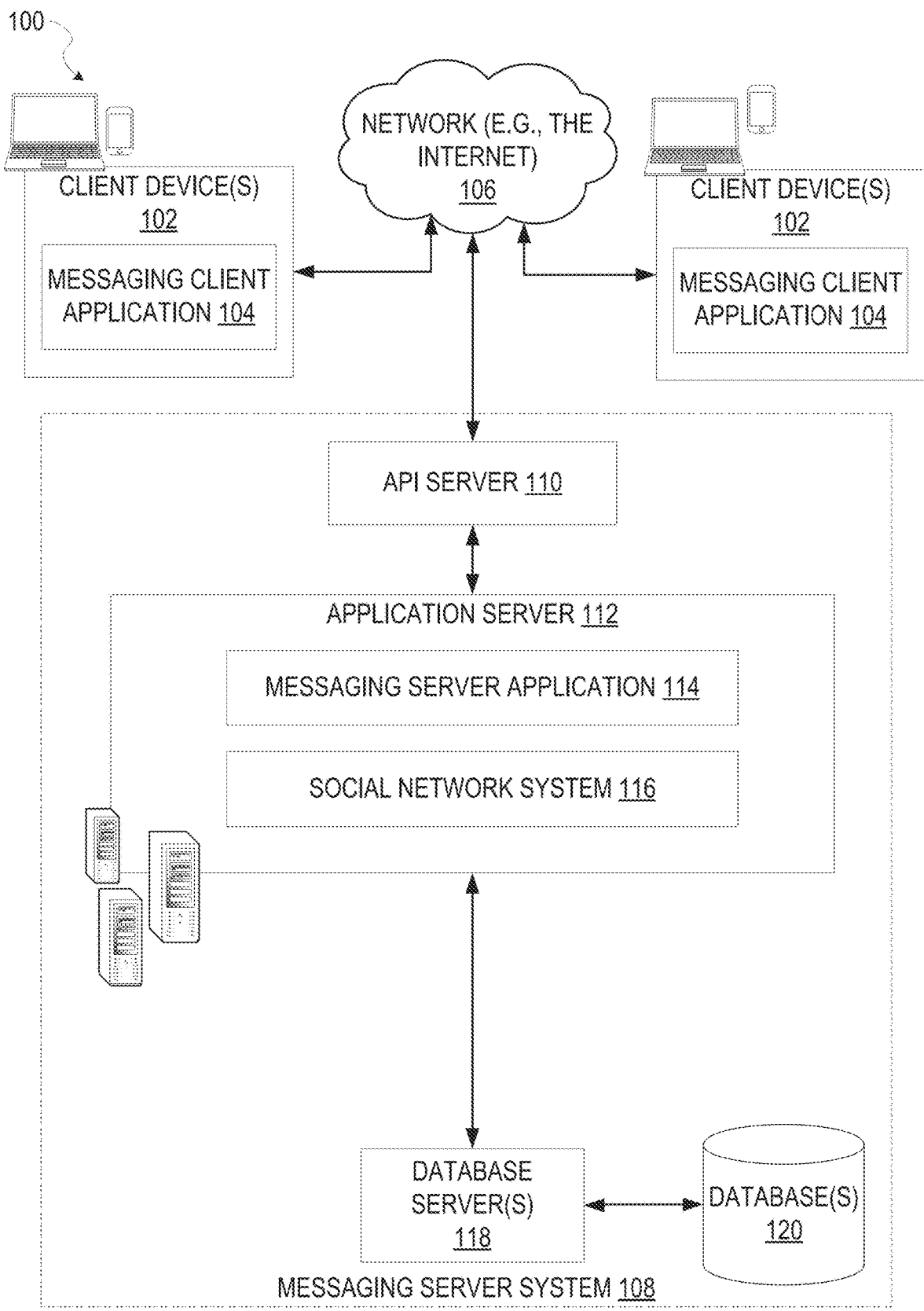
FIG. 1 is a block diagram of one aspect of a messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces with a communications network (such as the network 106) to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

In the example shown in FIG. 1, each messaging client application 104 is able to communicate and exchange data with another messaging client application 104 and with the messaging server system 108 via the network 106. The data exchanged between the messaging client applications 104, and between a messaging client application 104 and the messaging server system 108, includes functions (e.g., commands to invoke functions) as well as payload data (e.g., text, audio, video, or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 106 or a portion of the network 106 may include a wireless or cellular network and the connection to the network 106 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third-Generation Partnership Project (3GPP) including 3G, fourth-generation wireless (4G) networks, Universal Mobile Telecommunications System (UMTS), High-Speed Packet Access (HSPA), Worldwide interoperability for Microwave Access (WiMAX), Long-Term Evolution (LTE) standard, or others defined by various standard-setting organizations, other long-range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Programming Interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the application server 112, for possible access by another messaging client application 104; the setting of a collection of media data (e.g., story); the retrieval of a list of friends of a user of a client device 102; the retrieval of such collections; the retrieval of messages and content; the adding and deletion of friends to and from a social graph; the location of friends within a social graph; and the detecting of an application event (e.g., relating to the messaging client application 104).

The application server 112 hosts a number of applications and subsystems, including a messaging server application 114 and a social network system 116. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The social network system 116 supports various social networking functions and services, and makes these functions and services available to the messaging server application 114. To this end, the social network system 116 maintains and accesses an entity graph within the database 120. Examples of functions and services supported by the social network system 116 include the identification of other users of the messaging system 100 with whom a particular user has relationships or whom the user is "following," and also the identification of other entities and interests of a particular user.

In at least some of the disclosed embodiments, a user may decorate images using creative content provided by a social network provider. For example, a user may add a content to an existing image. The content added to an image may be marketed to the user as a "sticker" which may be added to an image. A sticker may be, in some aspects, another image, an emoji, or other graphical resource. In some cases, the user may place the added content (e.g. sticker) in a sky region of an image. Alternatively, the user may place the content (e.g. sticker) in a region of an image that does not include sky. The disclosed methods and systems may modify the added content (e.g. sticker) to include a cloud texture when the content is placed in the sky region in some aspects. To modify the content to include the cloud texture, particular processing of the content may be performed. For example, in some aspects, the content may be converted to grayscale and blurred. The cloud texture may then be combined with the blurred image to form a version of the content having the cloud texture.

Figure 2:
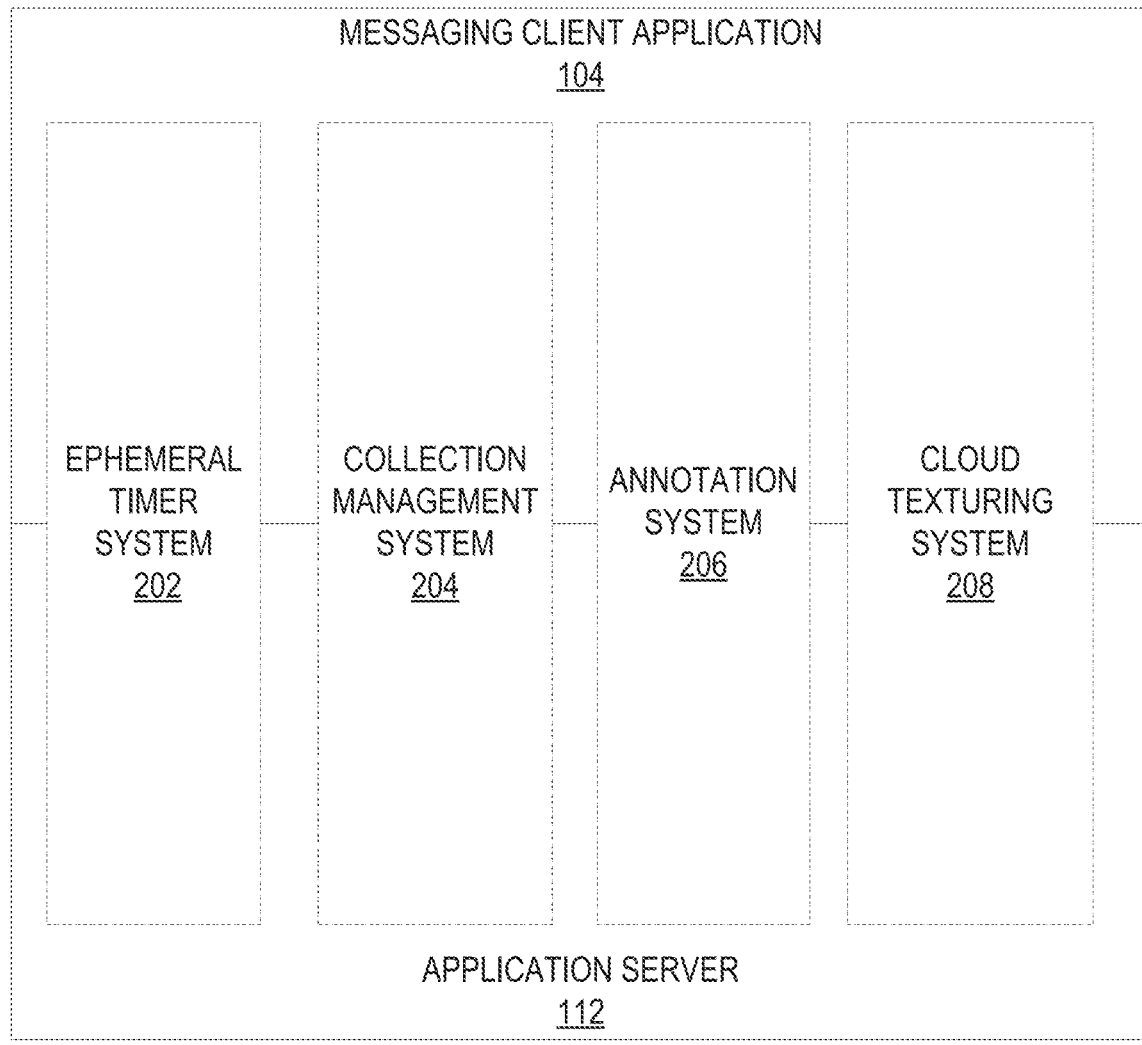
FIG. 2 is block diagram illustrating further details regarding the messaging system, according to some embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of subsystems, namely an ephemeral timer system 202, a collection management system 204, an annotation system 206, and a cloud texturing system 208.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story, such as the story component 404 discussed below), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The annotation system 206 provides various functions that enable a user to annotate or otherwise modify or edit media content associated with a message. For example, the annotation system 206 provides functions related to the generation and publishing of media overlays for messages processed by the messaging system 100. For example, the annotation system 206 operatively supplies a media overlay to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations; and sound effects. An example of a visual effect includes color overlaying. The audio and visual content or the visual effects can be applied to a media content item (e.g., a photo) at the client device 102. For example, the media overlay may include text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another exemplary embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The cloud texturing system 208 may provide for automatic texturing of content added to an image. The automatic texturing may be based, in some aspects, on a location of the content added to the image. For example, in some aspects, the cloud texturing system 208 may identify a sky portion of an image and a non-sky portion of the image. A location of the content may then be evaluated to determine if the location is within the sky portion or the non-sky portion. If the content is located in the sky portion, a cloud texture may be added to the content. In some aspects, the content may be a sticker.

Figure 3A:
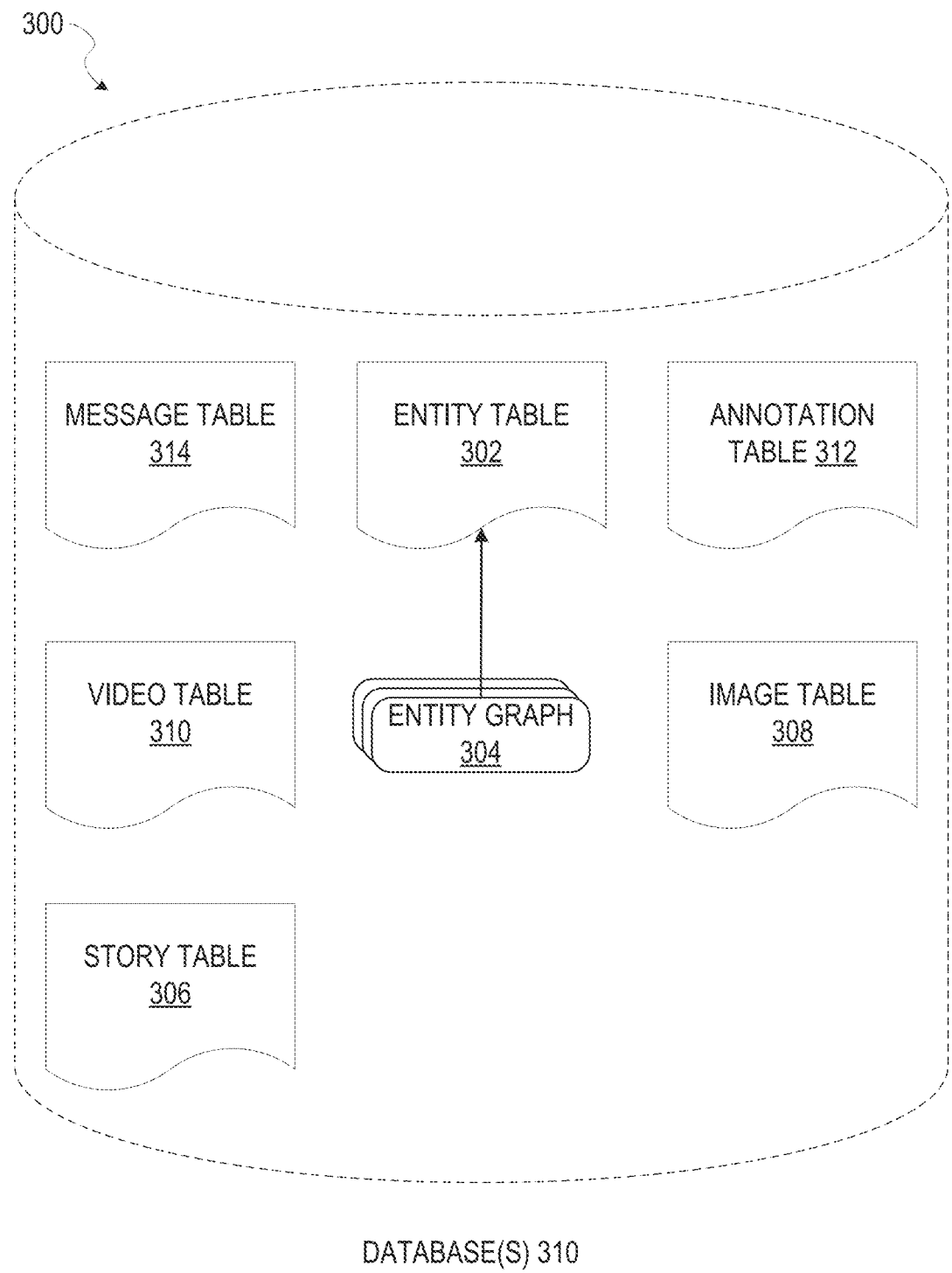
FIG. 3A is an example of a data base schema utilized by the messaging system of FIG. 1.

FIG. 3A is a schematic diagram 300 illustrating data which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 614. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (UPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., a user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a created stream of user-submitted content from various locations and events. Users whose client devices have location services enabled and who are at a common location or event at a particular time may, for example, be presented with an option, via a user interface of the messaging client application 104, to contribute content to a particular live story. The live story may be identified to the user by, the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3B:
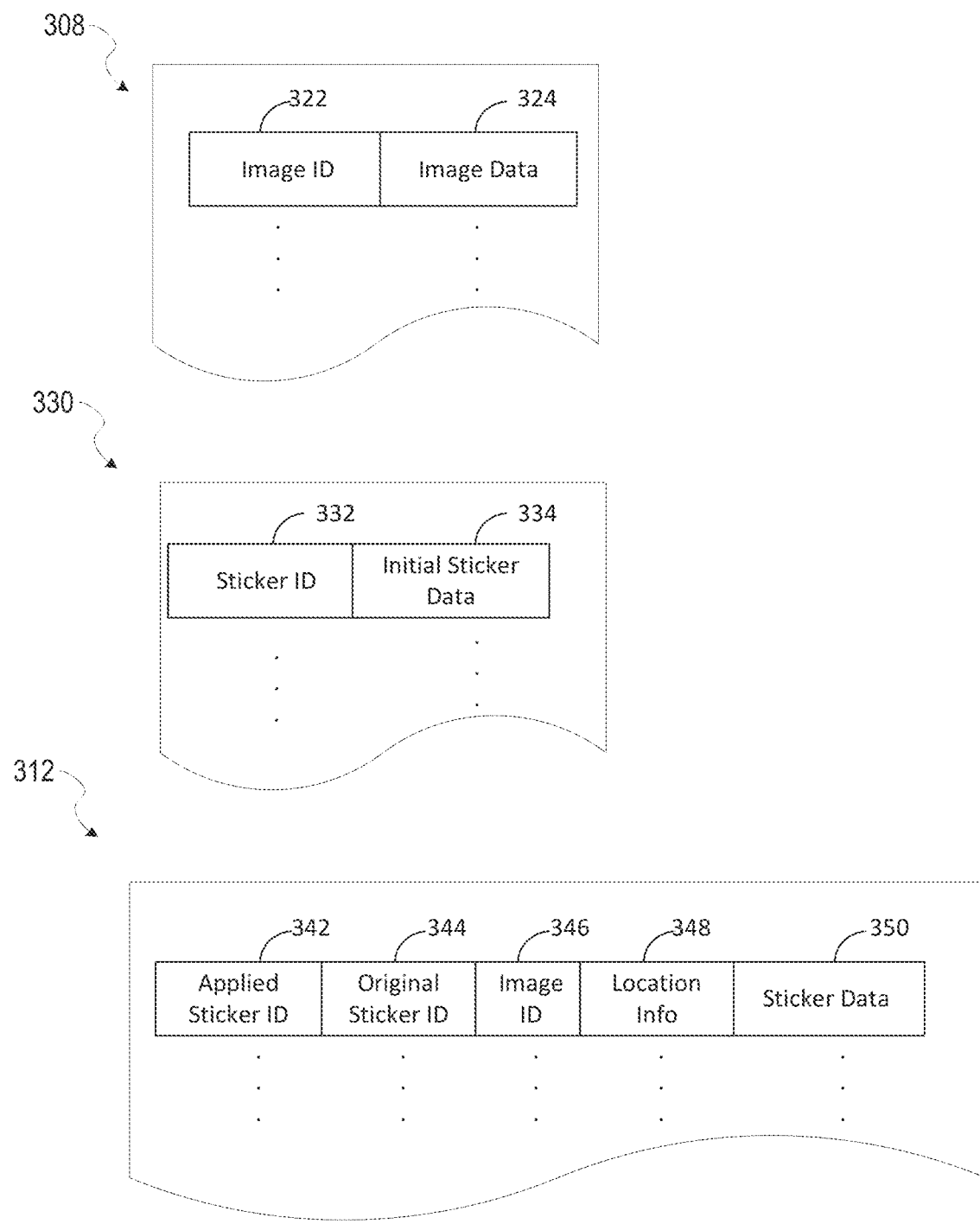
FIG. 3B shows example relational database formats that may be used in various embodiments.

FIG. 3B illustrates relational database formats for the image table 308, a sticker table 330, and the annotation table 312. Each of the illustrated relational database formats may be utilized in various embodiments disclosed herein, either alone or in combination. Columns of the image table 308 include an image identifier 332 and image data 324. The image identifier 332 uniquely identifies a particular image stored in the image table 308. The image data 324 defines the image having the image identifier 322. For example, the image data 324 may define pixel values for the image having the image identifier 322. Columns in the sticker table 330 include a sticker identifier 332 and initial sticker data 334. The sticker identifier 332 uniquely identifies a particular sticker. The initial sticker data 334 includes image data (e.g. pixel values) for the sticker having the sticker identifier 332. For example, when a sticker having a sticker identifier 332 is initially placed on an image by a user, the sticker may initially be defined by data stored in the initial sticker data column 334.

The annotation table 312 stores information relating to stickers annotated to images. Columns in the annotation table 312 include an applied sticker identifier 342, original sticker identifier 344, image identifier 346, location information 348, and sticker data 350. The sticker identifier 342 uniquely identifies an applied sticker. In other words, there may be at least a row in the annotation table 312 for every sticker annotated to every image. The original sticker identifier 344 identifies a sticker that was originally applied to an image. For example, the original sticker identifier 344 may cross reference the sticker identifier 332. The image identifier 346 identifies to which image the applied sticker (e.g. applied sticker id 342) has been applied. The image identifier 346 may cross reference the image id 322 in the image table 308. The location info 348 may store information indicating a location of the applied sticker (e.g. applied sticker id 342) in the image (e.g. image id 346). For example, in some aspects, the location info 348 may indicate pixel coordinates of the sticker within the image based on an offset from a corner of the image (such as a top left or bottom left corner for example). The sticker data 350 may include image data (e.g. pixel values) for the sticker (e.g. applied sticker id 342) as applied to the image (e.g. image id 346). The sticker data 350 may be initialized based on data stored in the initial sticker data column 344 of the sticker table 330 in some aspects. The sticker data 350 may, in some aspects, be later modified to deviate from the default sticker definition stored in the initial sticker data 334. For example, some embodiments disclosed may modify the sticker data 350 such that the sticker includes a cloud-like texture. This may cause the sticker data 350 to change relative to the initial sticker data 334 in some aspects.

Figure 4:
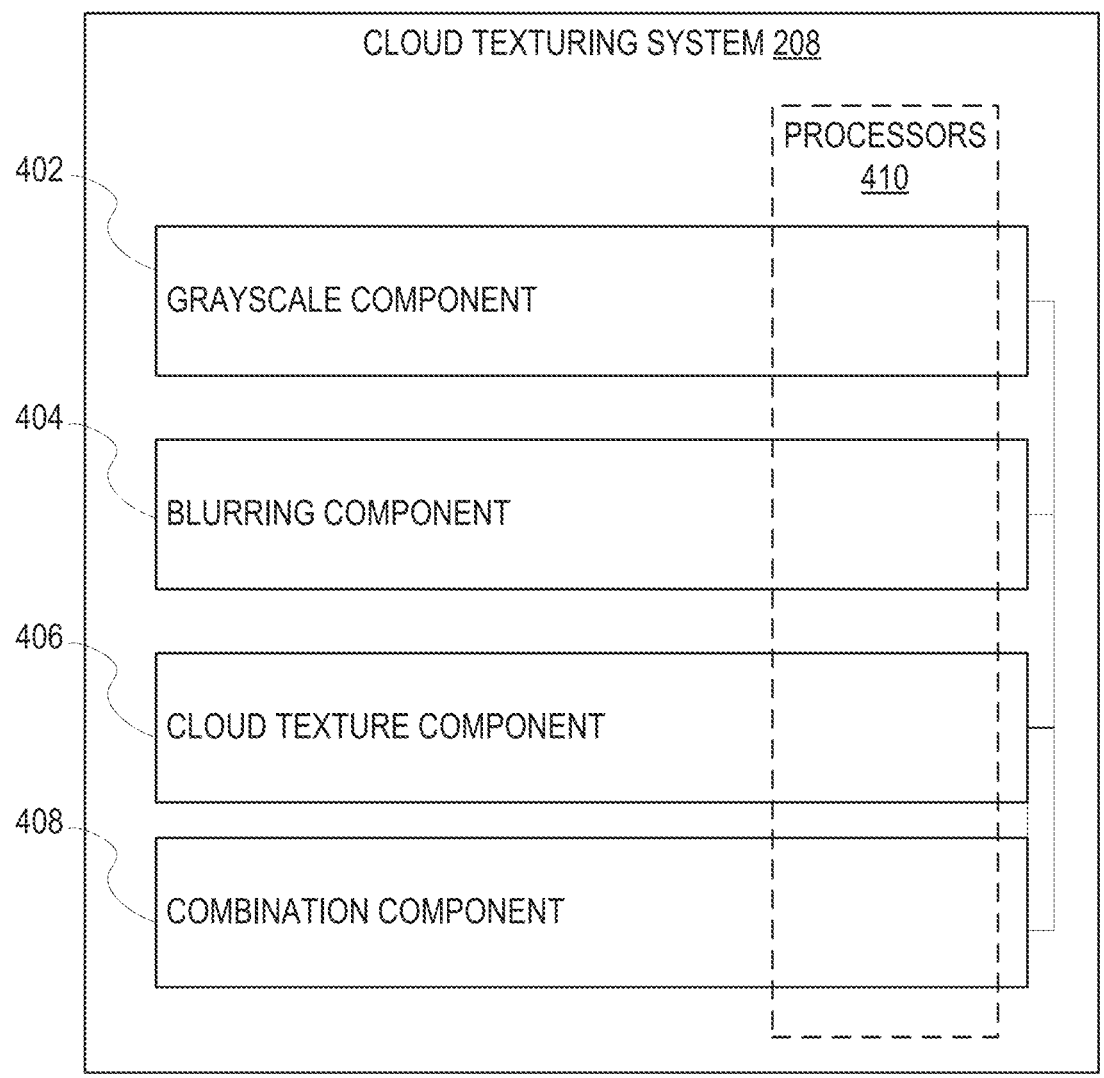
FIG. 4 is a block diagram illustrating functional components of a cloud texturing system in some embodiments.

FIG. 4 is a block diagram illustrating functional components of the cloud texturing system 208 that forms part of the messaging system 100, according to some example embodiments. To avoid obscuring the inventive subject matter with unnecessary detail, various functional components (e.g., modules, engines, and databases) that are not germane to conveying an understanding of the inventive subject matter have been omitted from FIG. 4. However, a skilled artisan will readily recognize that various additional functional components may be supported by the cloud texturing system 208 to facilitate additional functionality that is not specifically described herein. As shown, the cloud texturing system 208 includes a grayscale component 402, blurring component 404, cloud texture component 406, and a combination component 408.

The above referenced functional components of the cloud texturing system 208 are configured to communicate with each other (e.g., via a bus, shared memory, a switch, or APIs). Collectively, these components facilitate selective modification of content, such as stickers, to include a cloud texture, based at least in part, on a location of the content within an image.

The grayscale component 402 is responsible for modifying content from a color form to a grayscale form. The grayscale component 402 may receive as input, content added to an original image. The grayscale component 402 may generate as output, a grayscale version of the content. The content may be, in some aspects, a sticker. The content may be, in some aspects, image data. In some aspects, the grayscale component 402 may measure an intensity of light at each pixel in the content. The measurement may be according to a particular weighted combination of frequencies (or wavelengths), and may be monochromatic when a single frequency is captured. The measurement may then be mapped to a grayscale value, with higher intensities generally mapping to lighter gray and lighter intensities generally mapping to darker grays, at least in some aspects.

The blurring component 404 may blur the grayscale image generated by the gray scale component 402. The blurring component 404 may then output a blurred version of the image generated by the grayscale component 402. In some aspects, the blurring component 404 may perform a Gaussian blur to blur the image generated by the grayscale component 402. In some aspects, one or more of a mean filter, a weighted average filter, or a Gaussian filter may be utilized to blur the image.

The cloud texture component 406 may generate a cloud texture. In some aspects, the cloud texture component 406 may utilize fractal Brownian Motion (fBM) or simply "fractal noise" to create the cloud pattern, as discussed below. In some aspects, the cloud texture may be based on Perlin noise. In some aspects, the cloud texture component 406 may utilize fractal Brownian Motion (fBM) to wrap a space of a fractal Brownian motion (IBM).

The combination component 408 may combine the blurred content generated by the blurring component 404 with the cloud texture generated by the cloud texture component 406. The result may be added to the original image in some aspects.

As is understood by skilled artisans in the relevant computer and Internet-related arts, each functional component illustrated in FIG. 4 may be implemented using hardware (e.g., a processor of a machine) or a combination of logic (e.g., executable software instructions) and hardware (e.g., memory and the processor of a machine) for executing the logic. For example, any component included as part of the cloud texturing system 208 may physically include an arrangement of one or more processors 410 (e.g., a subset of or among one or more processors of a machine) configured to perform the operations described herein for that component. As another example, any component of the cloud texturing system 208 may include software, hardware, or both, that configure an arrangement of the one or more processors 410 to perform the operations described herein for that component. Accordingly, different components of the cloud texturing system 208 may include and configure different arrangements of such processors 410 or a single arrangement of such processors 410 at different points in time.

Furthermore, the various functional components depicted in FIG. 4 may reside on a single machine (e.g., a client device or a server) or may be distributed across several machines in various arrangements such as cloud-based architectures. Moreover, any two or more of these components may be combined into a single component, and the functions described herein for a single component may be subdivided among multiple components. Functional details of these components are described below with respect to at least FIGS. 5-13.

Figure 5:
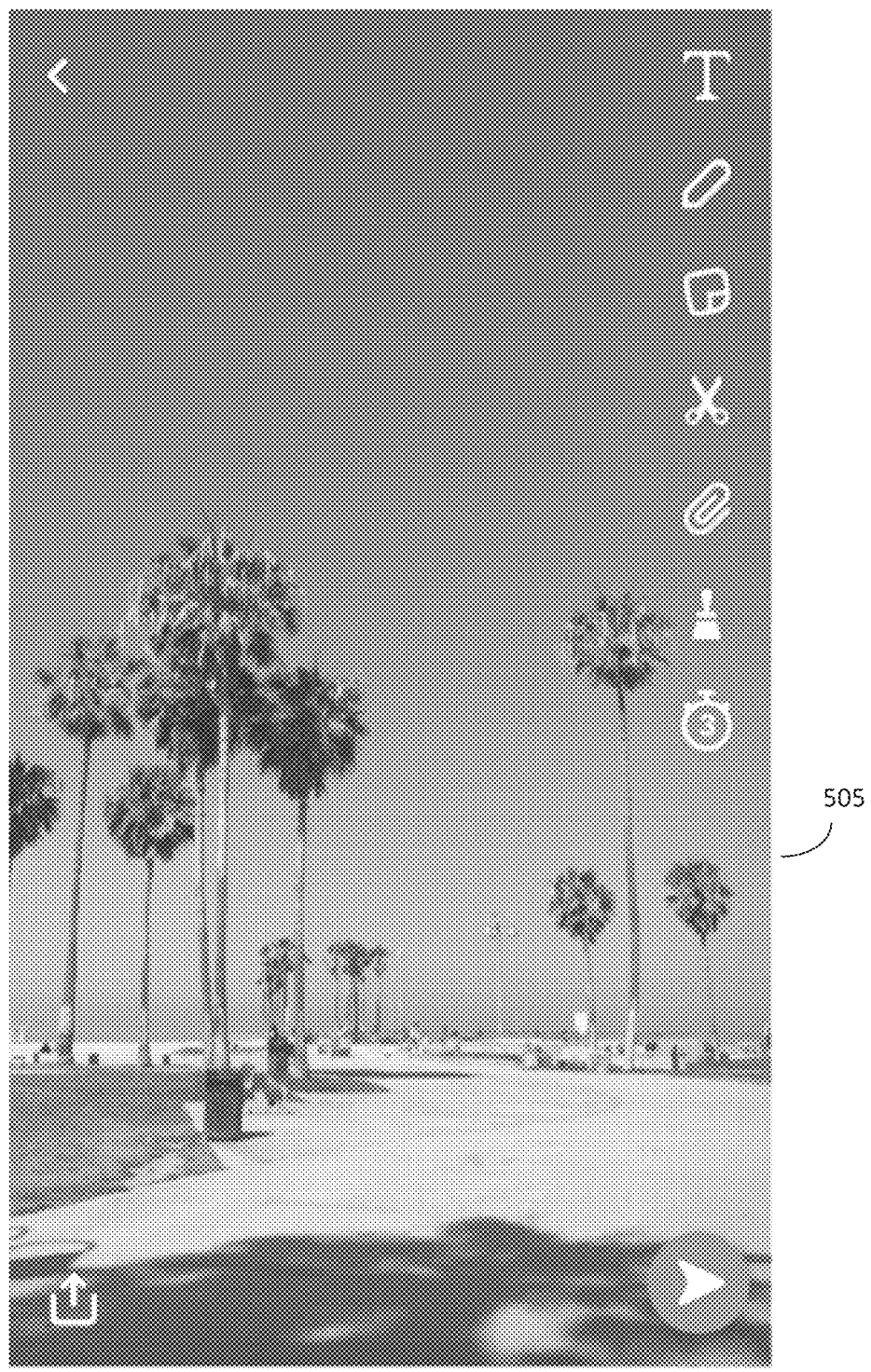
FIG. 5 shows an example image, according to some embodiments.

FIG. 5 shows an image 505. The image 505 may be, in some aspects, captured by an image sensor integrated with a client device 102. In some aspects, the image 505 may be received by a user in another manner. For example, the image 505 may be received via a messaging application or downloaded from the internet.

Figure 6:
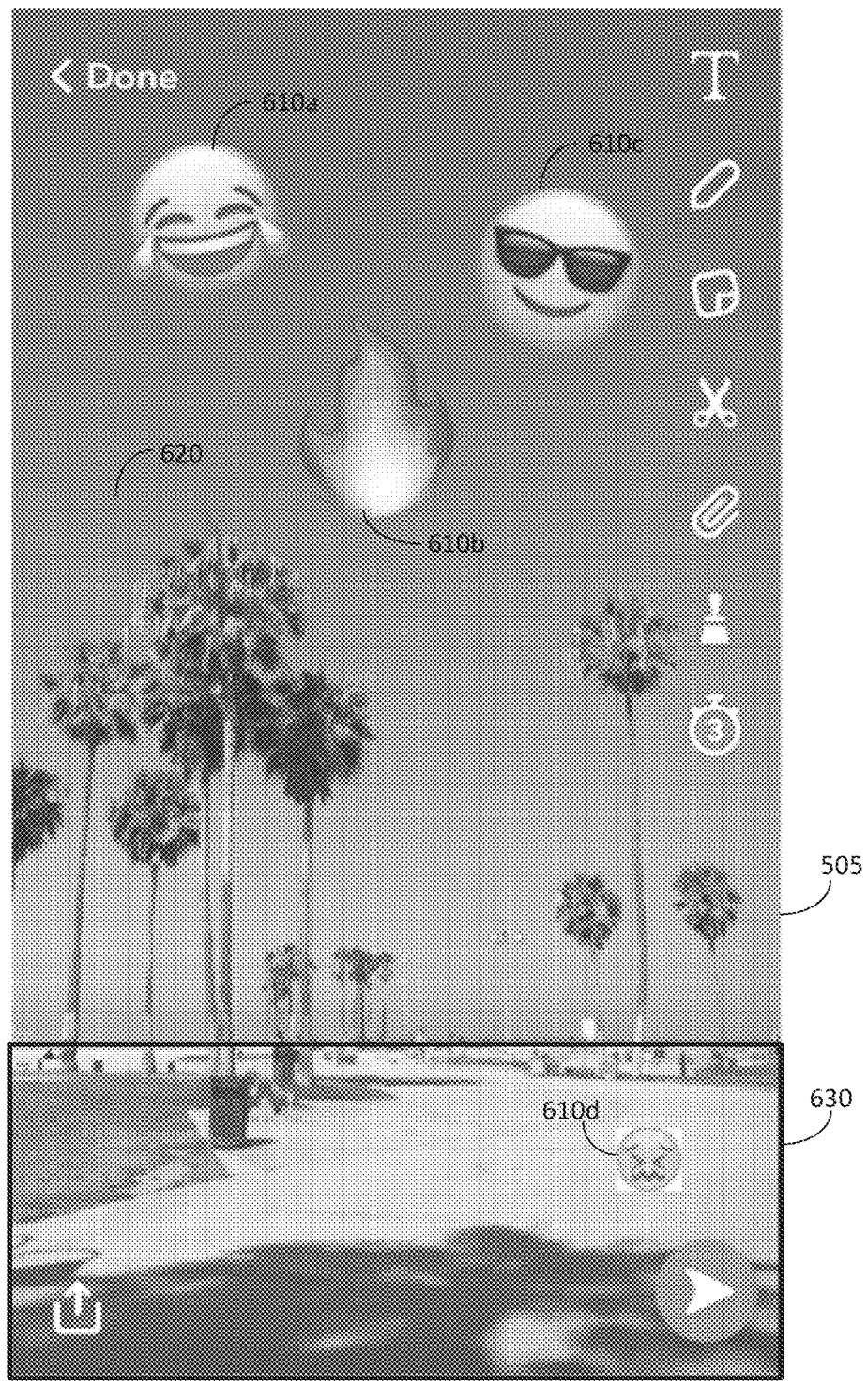
FIG. 6 shows an example image with four additional content added, according to some embodiments.

FIG. 6 shows the image 505 with four additional content 610a-d added. The content 610a-d may be added by a user in some aspects. The content 610a-c are shown added to a sky region 620 of the image 505. The content 610d is added to a non-sky region 630. In some aspects, the sky region 620 may be identified based on a classifier. The classifier may be trained using training images providing examples of sky regions and non-sky regions. Based on the training images, the classifier may segment the image 505 into the sky region 620 and non-sky region 630. More details on these embodiments are discussed below.

Figure 7:
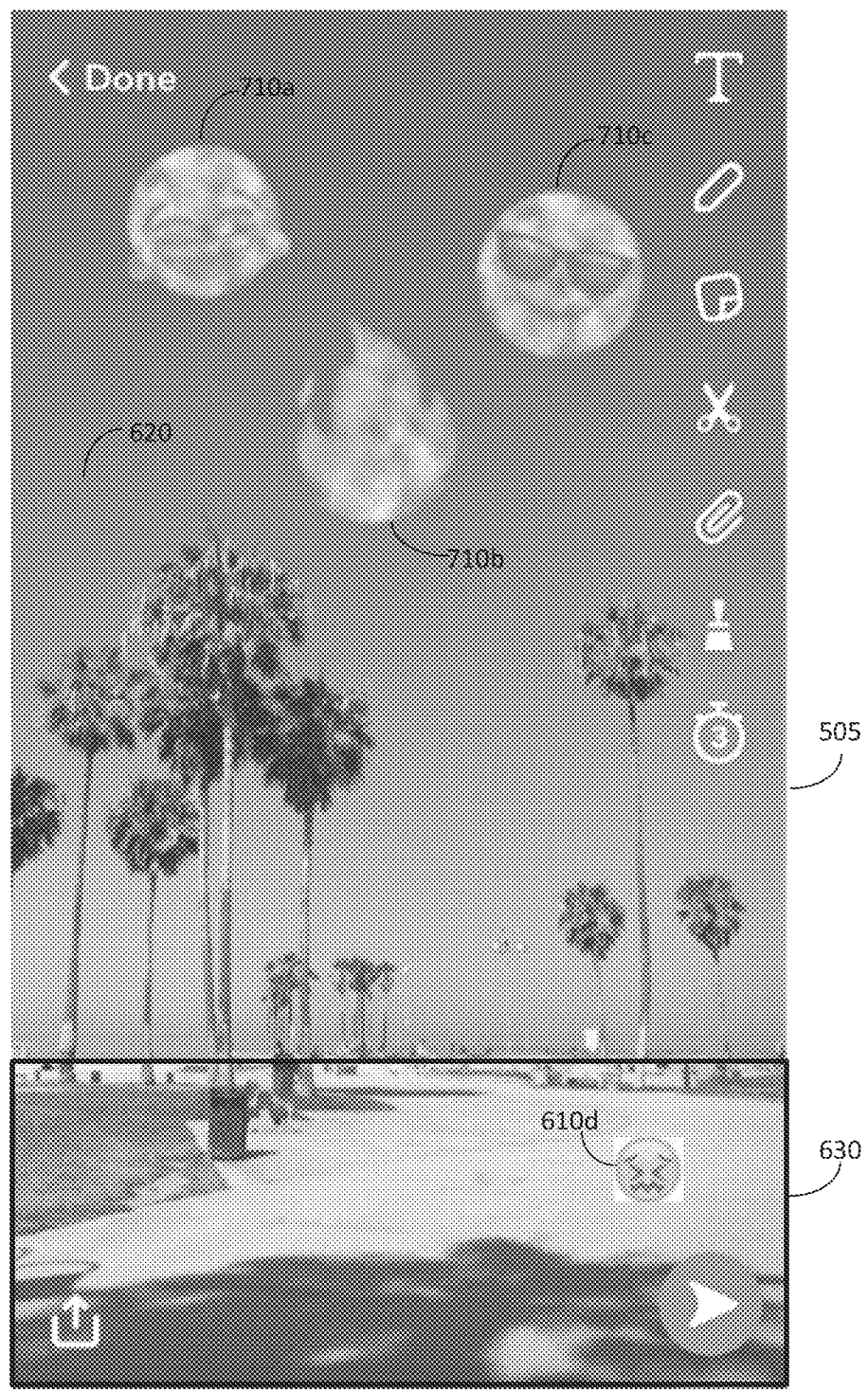
FIG. 7 shows the example image of FIG. 6 after the additional content has been modified to have a cloud-like texture.

FIG. 7 shows the image 505 after the content 610a-c has been modified to content 710a-c, which have a cloud-like texture. The content 610d has not been modified in the image 505. In some aspects, the content 610a-c may be modified into content 710a-c in response to their locations in the image 505 being within the sky region 620. The content 610d is not located within the sky region 620 but is instead located within the non-sky region 630, and therefore may not be modified in a similar manner to content 610a-c.

Figure 8:
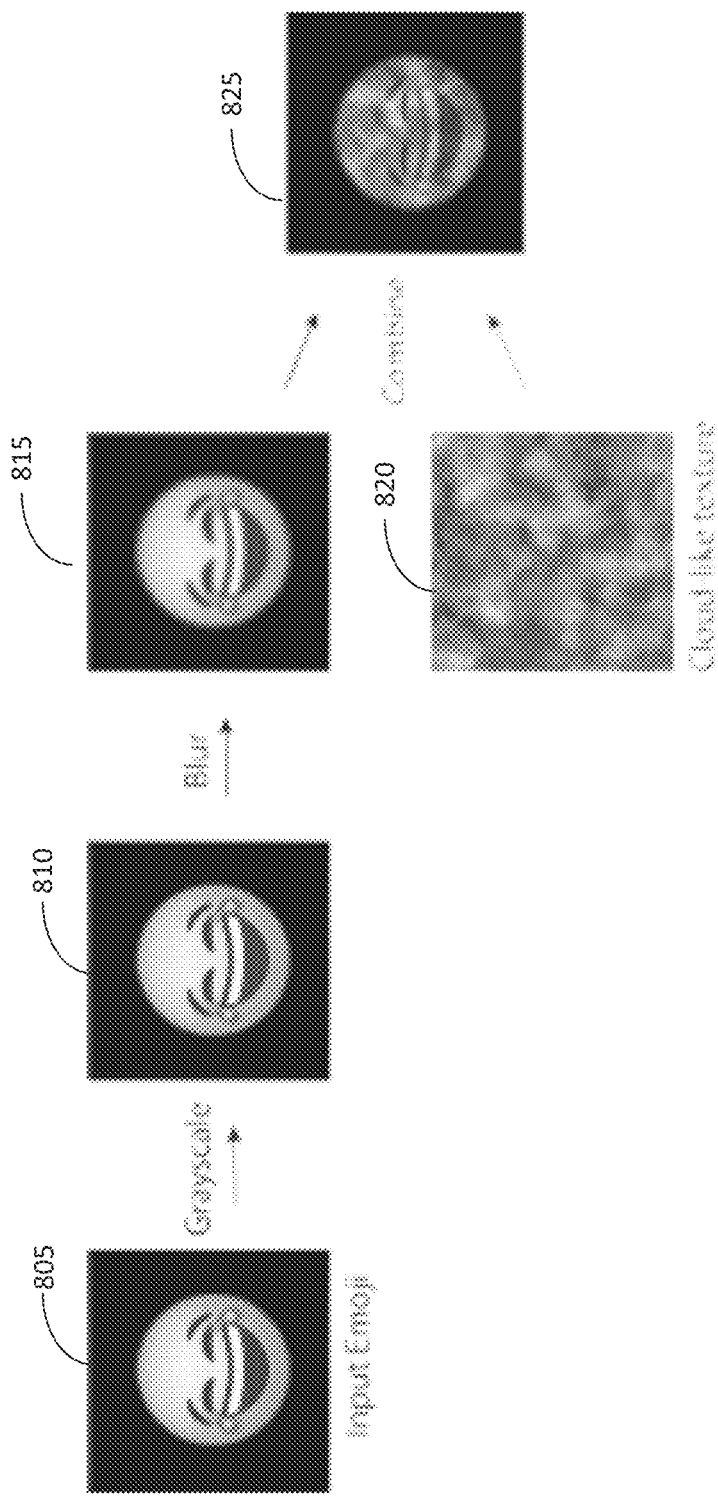
FIG. 8 is a data flow diagram illustrating how content may be modified to include a cloud texture.

FIG. 8 is a data flow diagram illustrating how content may be modified to include a cloud texture. Content 805 may be received, in some aspects, in a color form. In the illustrated embodiment, the content 805 is a colored emoji. The content 805 is then transformed into a grayscale image 810. As discussed above, the grayscale component 402 may convert the content 805 into a grayscale version of the content 810. The grayscale version 810 may then be blurred to generate the content 815. In some aspects, the blurring may be provided by the blurring component 404. A cloud like texture 820 may then be generated. As discussed above, in some aspects, the cloud like texture 820 may be generated using fractal Brownian Motion. In some aspects, the cloud like texture 820 may be generated by the cloud texture component 406. FIG. 8 further illustrates that the cloud like texture 820 and the blurred image 815 are combined to form a modified image 825.

Figure 9:
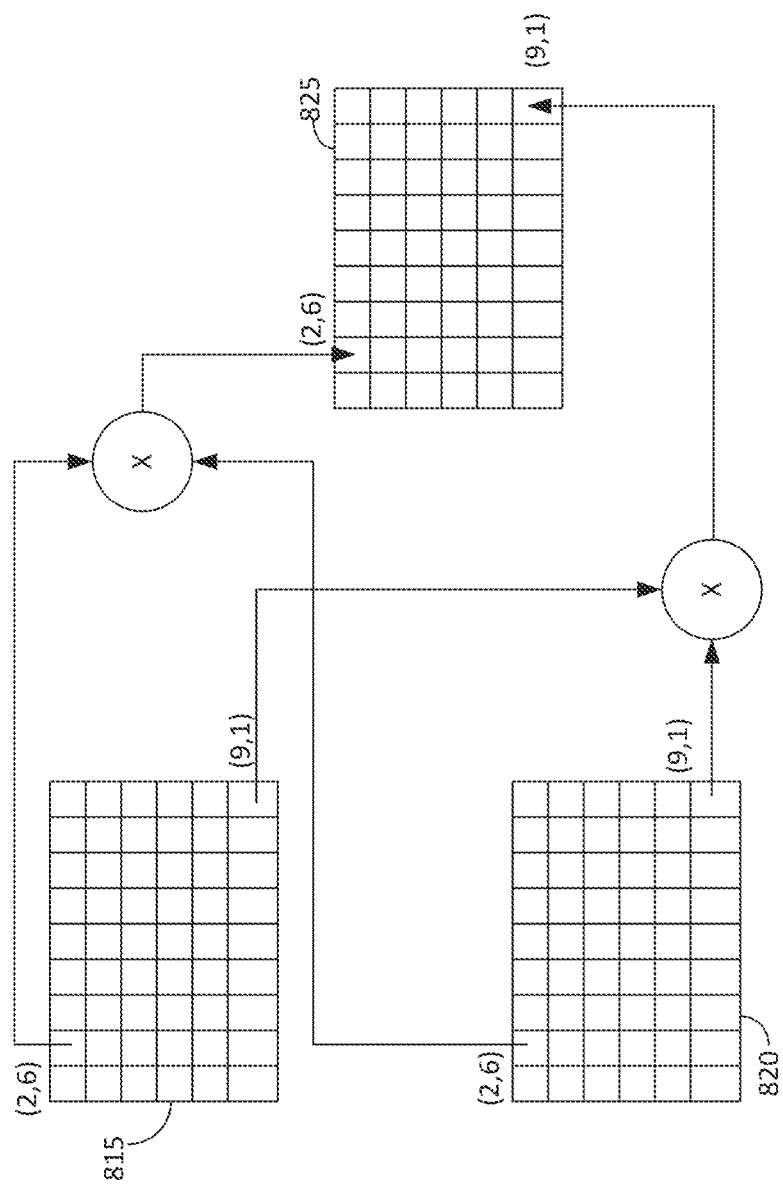
FIG. 9 is a simplified view of a process of combining images.

FIG. 9 is a simplified view of a process of combining images. For example, in some aspects, the process of combining images illustrated in FIG. 9 may be used to combine the images 815 and 820, discussed above with respect to FIG. 8. FIG. 9 illustrates that in some aspects, pixel values in a blurred image, such as image 815 discussed above with respect to FIG. 8, may be multiplied with corresponding pixel values in the cloud-like texture 815. In some aspects, corresponding pixel values may be located at identical coordinate positions within their respective image data. For example, FIG. 9 shows that pixel values located at position (2,6) in the images 815 and 820 are multiplied to generate a pixel value located at position (2,6) in the combined image 825. Similarly, FIG. 9 shows pixel values located at position (9,1) in the images 815 and 820 being multiplied to generate a pixel value located at position (9,1) in the combined image 825. While FIG. 9 shows two sample pixel values being combined in the images 815 and 820, one of skill would understand that this combination may be repeated for a larger portion or all of the pixel values within the image data 815 and/or 820 in various embodiments. In some aspects, the generated cloud-like texture 820 may not be as large as the content 815. Thus, in some aspects, the cloud-like texture 820 may be replicated as needed to form a cloud-like texture 820 of equivalent size to the content 815. Alternatively, a correspondence between one or more pixel values of the cloud like texture 820 and multiple pixel values of the content 815 may be created, such that each pixel value in the content 815 may be multiplied with a corresponding pixel value in the cloud-like texture 820, even if there is not a 1:1 correspondence between pixel values of the content 815 and cloud-like texture 820.

Figure 10:
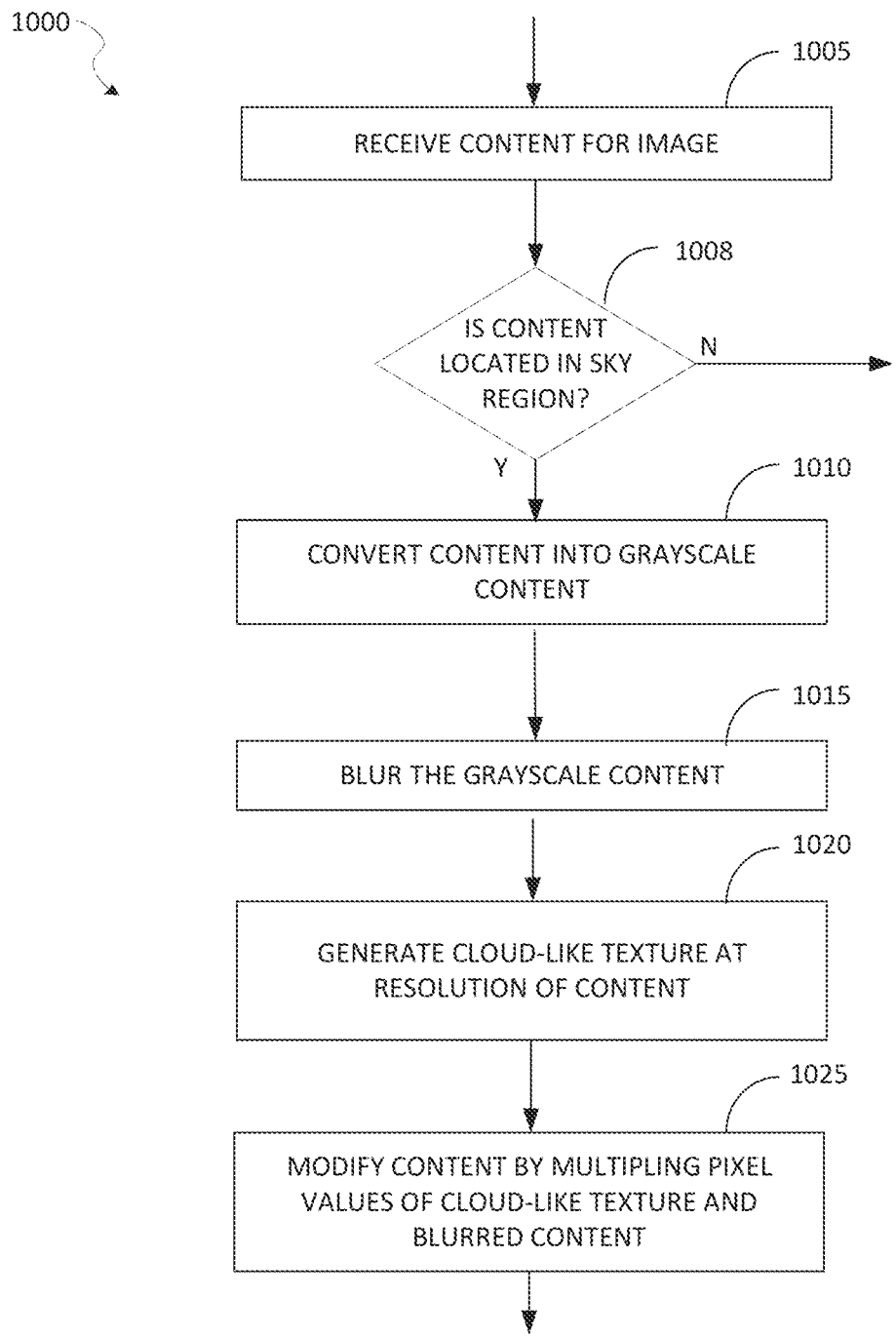
FIG. 10 is a flowchart of a method of modifying content associated with an image.

FIG. 10 is a flowchart of a method of modifying content associated with an image. In some aspects, the content may be added to the image. For example, in some aspects, a social network may provide an ability for users to add content to an image. In some aspects, adding content to an image may be presented to a user as adding a "sticker" to an image. In some aspects, one or more of the functions discussed below with respect to FIG. 10 may be performed by an electronic hardware processor. For example, instructions stored in one or more of the grayscale component 402, blurring component 404, cloud texture component 406, and/or the combination component 408 may configure one or more of the hardware processors 410 to perform one or more of the functions discussed below with respect to FIG. 10. In some aspects, one or more of the functions of process 1000 discussed below may be performed by the processing unit 1354. For example, instructions 1304, discussed below with respect to FIG. 13, may configure the processing unit 1354 to perform one or more of the functions of process 1000 discussed below. In some aspects, instructions 1410, discussed below with respect to FIG. 14, may configure processors 1404 to perform one or more of the functions of process 1000 discussed below.

In block 1005, content for an image is received. For example, as described above with respect to FIGS. 5-8, an image, such as the image 505, may include content, such as one or more of the content 610a-d. In some aspects, the content may represent a portion of pixel values within the image itself, or may be separate from the image. In some aspects, the content may be a sticker that is placed on the image by a user. For example, in these aspects, the image may be represented by the image table 308, in the form of a row, including the image identifier 322 and image data 324 in some aspects. The content may be represented by a row in the annotation table 312 in some aspects. The content may have a location in the image (e.g. location info 348). Decision block 1008 determines whether the received content is located in a sky portion of the image, in some aspects, block 1008 includes segmenting the image received in block 1005 into at least a sky region and a non-sky region. In some aspects, this segmentation is provided by a trained classifier, as discussed in more detail below. Block 1008 may determine whether a location of the content received in block 1005 is within the sky region or the non-sky region. If the content is not located in a sky region of the image, process 1000 takes the "No" path out of block 1008 and processing continues.

Otherwise, process 1000 moves from block 1008 to block 1010, which converts the content into gray scale content. The content may be, in some aspects, a sticker. The content may be, in some aspects, image data. In some aspects, block 1010 may measure an intensity of light at each pixel in the content. The measurement may be according to a particular weighted combination of frequencies (or wavelengths), and may be monochromatic when a single frequency is captured. The measurement may then be mapped to a grayscale value, with higher intensities generally mapping to lighter gray and lighter intensities generally mapping to darker grays, at least in some aspects.

In block 1015, the grayscale content is blurred. In various aspects, one or more of a mean filter, a weighted average filter, or a Gaussian filter may be utilized to blur the grayscale content. For example, in one aspect, block 1015 may perform a Gaussian blur to blur the grayscale content.

In block 1020, a cloud-like texture is generated. The texture may be generated at a resolution equivalent to a resolution of the content. In some aspects, block 1020 may utilize fractal Brownian Motion (fBM) or simply "fractal noise" to create the cloud like texture. In some aspects, the cloud texture may be based on Perlin noise. In some aspects, block 1020 may use fractal Brownian Motion (fBM) to wrap a space of a fractal Brownian motion (fBM). For example, some embodiments may utilize the ZNoise open source library to obtain fbm( ) functions (ZNoise is available on github in 2017). Using ZNoise, a simple cloud-like texture may be obtained via the following code sample:

```
float pattern (in vec2 p)
{
    vec2 q=vec2 (fbm (p+vec2(0.0, 0.0)),
        fbm (p+vec2 (5.2, 1.3)));
    vec2 r=vec2 (fbm (p+4.0*q+vec2 (1.7, 9.2)),
        fbm (p+4.0*q+vec2 (8.3, 2.8)));
    return fbm (p+4.0*r);
}
```

The particular offset values in the fbm calls above are simple examples, and may vary by embodiment.

In block 1025, the blurred content and the cloud like texture are combined. In some aspects, the combination may be performed by multiplying pixel values of the cloud like texture and the blurred content. For example, in some aspects, the blurred content and the cloud like texture may be combined as discussed above with respect to FIG. 9.

Some aspects of process 1000 include displaying the image, and overlaying the content on the image. For example, the image may be displayed on a display of the client device 102 in some aspects. The location of the content on the image may be determined based on location information associated with the content. For example, as discussed above with respect to the annotation table 312, location info 348 may be stored for each applied content or sticker. This location information may indicate where on the image (e.g. image id 346) the content is to be overlaid.

Figure 11:
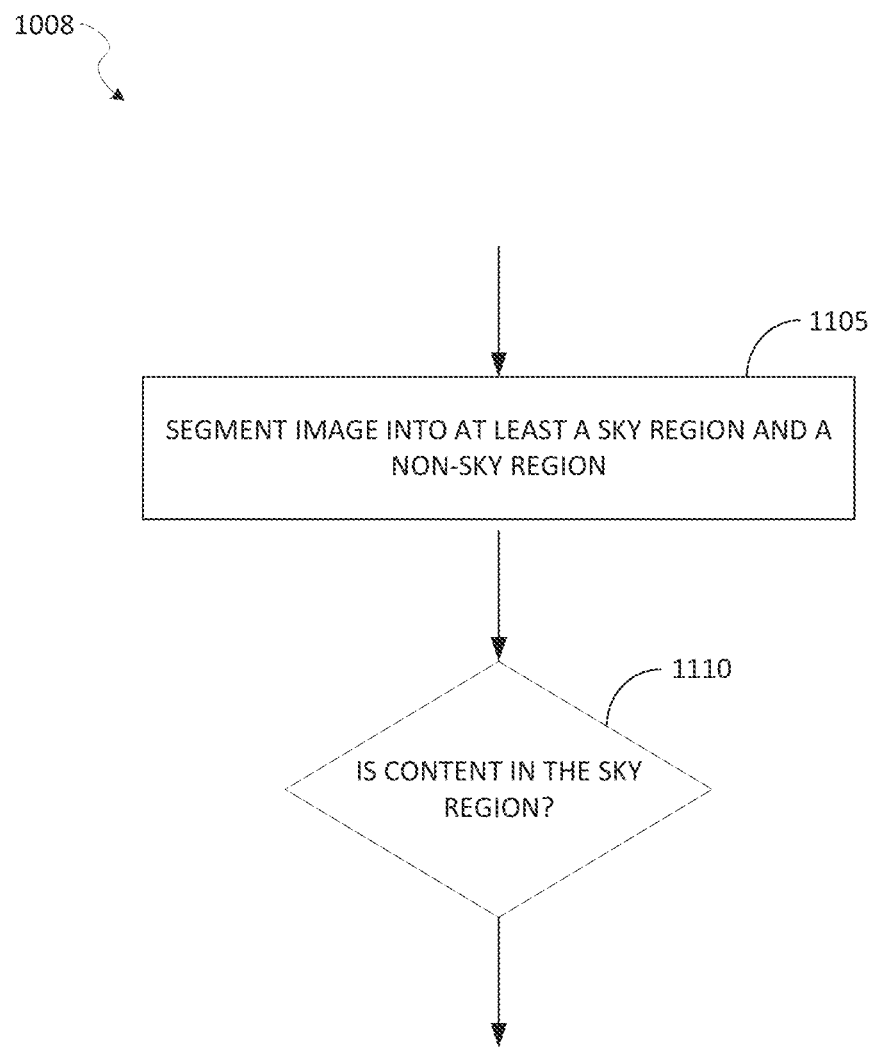
FIG. 11 is a flowchart of a method of modifying content associated with an image.

FIG. 11 is a flowchart of a method of modifying content associated with an image. In some aspects, the content may be added to the image. For example, in some aspects, a social network may provide an ability for users to add content to an image. In some aspects, adding content to an image may be presented to a user as adding a "sticker" to an image. In some aspects, one or more of the functions discussed below with respect to FIG. 11 may be performed by an electronic hardware processor. For example, instructions stored in one or more of the grayscale component 402, blurring component 404, cloud texture component 406, and/or the combination component 408 may configure one or more of the hardware processors 410 to perform one or more of the functions discussed below with respect to FIG. 11. In some aspects, one or more of the functions of process 1008 discussed below may be performed by the processing unit 1354. For example, instructions 1304, discussed below with respect to FIG. 13, may configure the processing unit 1354 to perform one or more of the functions of process 1008 discussed below. In some aspects, instructions 1410, discussed below with respect to FIG. 14, may configure processors 1404 to perform one or more of the functions of process 1000 discussed below.

In block 1105, an image is segmented in at least sky region and a non-sky region. For example, as discussed above with respect to FIG. 6, the image 505 may be segmented into a sky region 620 and a non-sky region 630 in some aspects. In some aspects, the segmentation of the image may be based on a trained classifier. The trained classifier may be trained based on training images. Based on the training images, the trained classifier may distinguish between sky regions of the image and non-sky regions of the image. An example operation of a classifier is discussed below with respect to FIG. 12. Decision block 1110 determines whether the content is within the sky region or the non-sky region of the image, as discussed above with respect to block 1008 of FIG. 10 for example.

Figure 12:
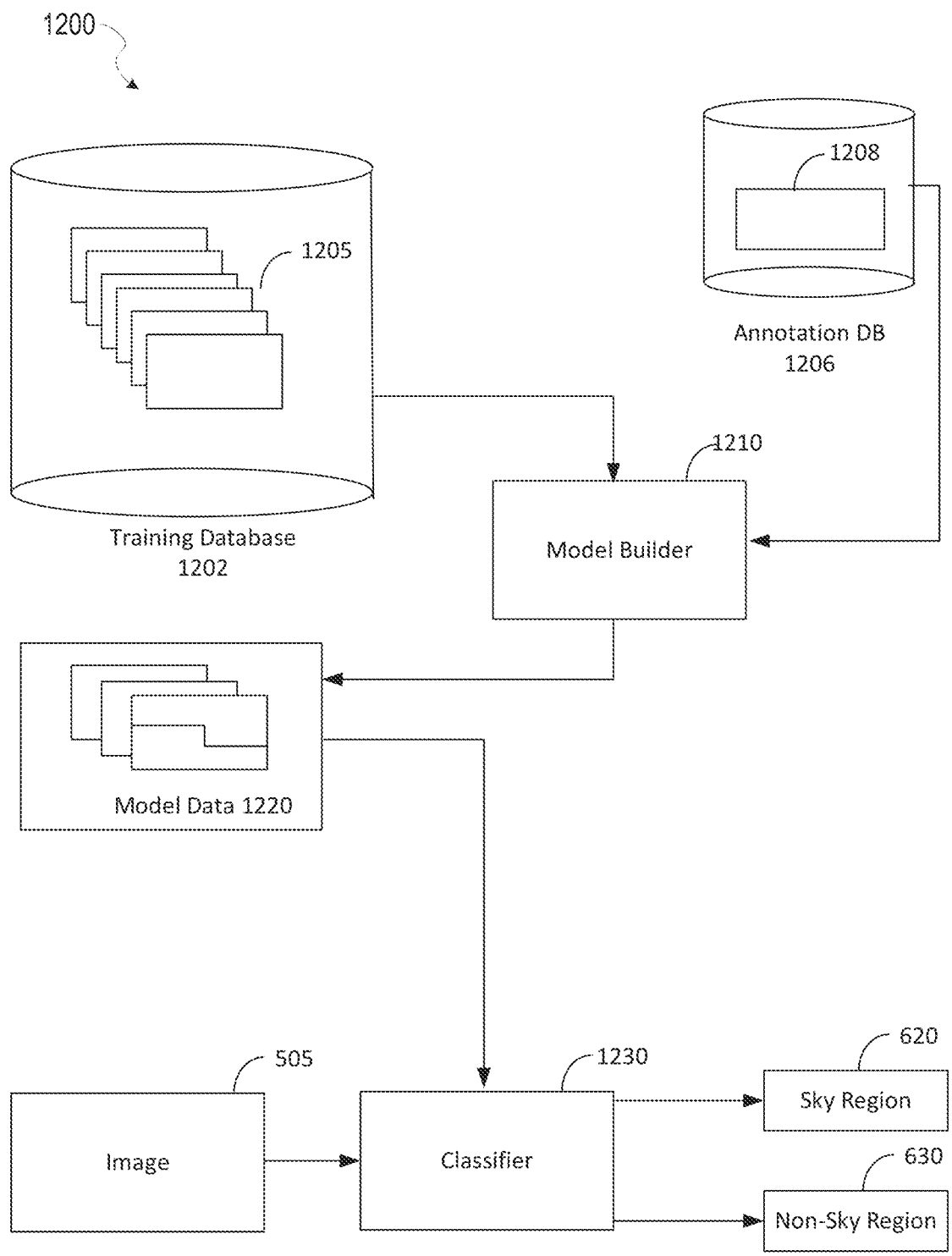
FIG. 12 is a data flow diagram of one exemplary method of training a model for sky segmentation of an image.

FIG. 12 is a data flow diagram of one exemplary method of training a model for sky segmentation of an image. In some aspects, the classifier 1230, discussed in more detail below, may identify one or more of the sky region 620 and non-sky region 630, discussed above with respect to FIGS. 6-7. In some aspects, the classifier 1230 may be utilized by block 1105, discussed above with respect to FIG. 11, to segment an image into at least a sky region and a non-sky region. In some aspects, one or more of the functions and/or dataflows described below with respect to dataflow 1200 and FIG. 12 may be performed by the processing unit 1354, discussed below with respect to FIG. 13. For example, instructions 1304, discussed below with respect to FIG. 13, may configure the processing unit 1354 to perform one or more of the data flows and/or functions of data flow 1200 discussed below. In some aspects, instructions 1410, discussed below with respect to FIG. 14, may configure processors 1404 to perform one or more of the data flows and/or functions of data flow 1200 discussed below.

FIG. 12 shows a training database 1202. The training database 1202 includes a plurality of training images 1204. Also shown is an annotation database 1206. The annotation database stores annotations 1208 that indicate sky portions of images in the training database 1202. The annotation database may also store annotations 1208 that indicate non-sky portions of images in the training database 1202. In some aspects, the annotation database 1206 may define polygons within the training images that represent sky portions, and other polygons within the training images that represent non-sky portions (polygons not shown). A model builder 1210 may read the training images 1205 and annotation data 1208 to generate a model database 1220. The model database 1220 may include data representing characteristics of the sky regions and non-sky regions of the images 1205. For example, in some aspects, the model builder 1210 may apply multiple filters to the training images 1205 and generate filter outputs. The filter outputs may be stored in the model database 1220 in some aspects. The model database 1220 may then be utilized to determine sky and non-sky regions in other images.

A classifier 1230 may then read the model data 1220 to determine a sky region and/or a non-sky region in an input image 502. For example, in some aspects, the classifier 1230 may apply various filters to the input image 505, and compare filter responses to filter responses stored in the model data 1220. By identifying similarities between the filter responses from portions of sky and non-sky portions of the training images 1205, the classifier 1230 may determine a sky region 620 and/or a non-sky region 630 in the input image 505. In some aspects, the data flow illustrated in FIG. 12 discussed above may be included in block 1105 of FIG. 11, or may precede performance of the process 1000, discussed above with respect to 10.

Software Architecture

Figure 13:
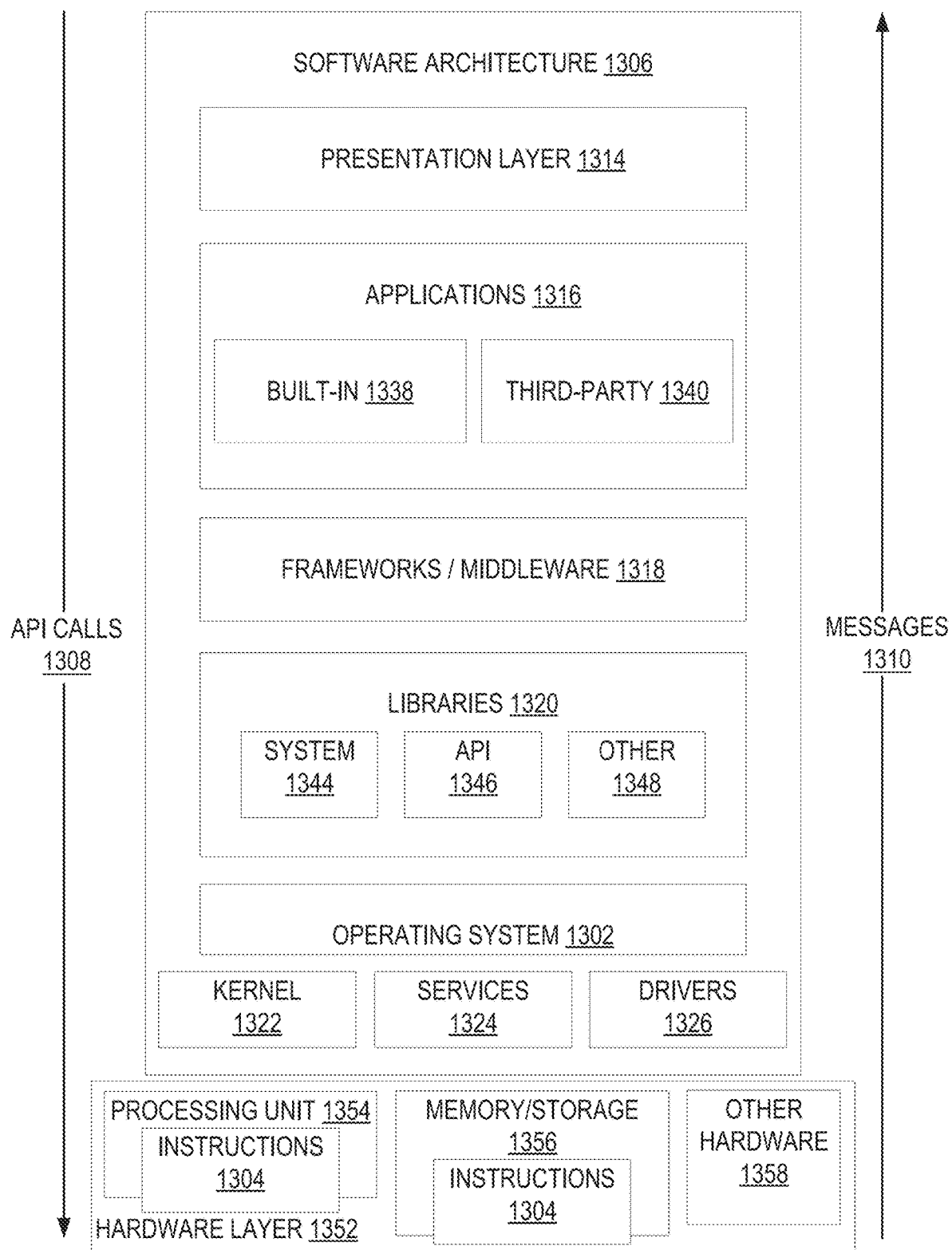
FIG. 13 is a block diagram illustrating an example software architecture.

FIG. 13 is a block diagram illustrating an example software architecture 1306, which may be used in conjunction with various hardware architectures herein described. FIG. 13 is a non-limiting example of a software architecture and it will be appreciated that many other architectures may be implemented to facilitate the functionality described herein. The software architecture 1306 may execute on hardware such as a machine 1400 of FIG. 14 that includes, among other things, processors 1404, memory/storage 1406, and I/O components 1418. A representative hardware layer 1352 is illustrated and can represent, for example, the machine 1400 of FIG. 14. The representative hardware layer 1352 includes a processing unit 1354 having associated executable instructions 1304. The executable instructions 1304 represent the executable instructions of the software architecture 1306, including implementation of the methods, components, and so forth described herein. The hardware layer 1352 also includes memory and/or storage 1356, which also have the executable instructions 1304. The hardware layer 1352 may also comprise other hardware 1358.

As used herein, the term "component" may refer to a device, a physical entity, or logic having boundaries defined by function or subroutine calls, branch points, APIs, and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner, in various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or include, any circuit or virtual circuit (a physical circuit emulated by logic executing on an actual processor) that manipulates data values according to control signals (e.g., "commands," "op codes," "machine code," etc.) and that produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some embodiments, the processors or processor-implemented components may be located in a single geographic location (e.g., within a home environment, an office environment, or a server farm). In other embodiments, the processors or processor-implemented components may be distributed across a number of geographic locations.

In the architecture of FIG. 13, the software architecture 1306 may be conceptualized as a stack of layers where each layer provides particular functionality. For example, the software architecture 1306 may include layers such as an operating system 1302, libraries 1320, frameworks/middleware 1318, applications 1316, and a presentation layer 1314. Operationally, the applications 1316 and/or other components within the layers may invoke API calls 1308 through the software stack and receive a response as messages 1310. The layers illustrated are representative in nature and not all software architectures have all layers. For example, some mobile or special-purpose operating systems may not provide a frameworks/middleware 1318 layer, while others may provide such a layer. Other software architectures may include additional or different layers.

The operating system 1302 may manage hardware resources and provide common services. The operating system 1302 may include, for example, a kernel 1322, services 1324, and drivers 1326. The kernel 1322 may act as an abstraction layer between the hardware and the other software layers. For example, the kernel 1322 may be responsible for memory management, processor management (e.g., scheduling), component management, networking, security settings, and so on. The services 1324 may provide other common services for the other software layers. The drivers 1326 are responsible for controlling or interfacing with the underlying hardware. For instance, the drivers 1326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1320 provide a common infrastructure that is used by the applications 1316 and/or other components and/or layers. The libraries 1320 provide functionality that allows other software components to perform tasks in an easier fashion than by interfacing directly with the underlying operating system 1302 functionality (e.g., kernel 1322, services 1324, and/or drivers 1326). The libraries 1320 may include system libraries 1344 (e.g., C standard library) that may provide functions such as memory allocation functions, string manipulation functions, mathematical functions, and the like. In addition, the libraries 1320 may include API libraries 1346 such as media libraries (e.g., libraries to support presentation and manipulation of various media formats such as MPEG4, H264, MP3, AAC, AMR, JPG, and PNG, graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1320 may also include a wide variety of other libraries 1348 to provide many other APIs to the applications 1316 and other software components/modules.

The frameworks/middleware 1318 provide a higher-level common infrastructure that may be used by the applications 1316 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1316 and/or other software components/modules, some of which may be specific to a particular operating system 1302 or platform.

The applications 1316 include built-in applications 1338 and/or third-party applications 1340. Examples of representative built-in applications 1338 may include, but are not limited to, a contacts application, a browser application, a book reader application, a location application, a media application, a messaging application, and/or a game application. The third-party applications 1340 may include an application developed using the ANDROID™ or IDS™ software development kit (SDK) by an entity other than the vendor of the particular platform, and may be mobile software running on a mobile operating system such as IOS™, ANDROID™, WINDOWS® Phone, or other mobile operating systems. The third-party applications 1340 may invoke the API calls 1308 provided by the mobile operating system (such as the operating system 1302) to facilitate functionality described herein.

The applications 1316 may use built-in operating system functions (e.g., kernel 1322, services 1324, and/or drivers 1326), libraries 1320, and frameworks/middleware 1318 to create user interfaces to interact with users of the system. Alternatively, or additionally, in some systems interactions with a user may occur through a presentation layer, such as the presentation layer 1314. In these systems, the application/component "logic" can be separated from the aspects of the application/component that interact with a user.

An Example Machine

Figure 14:
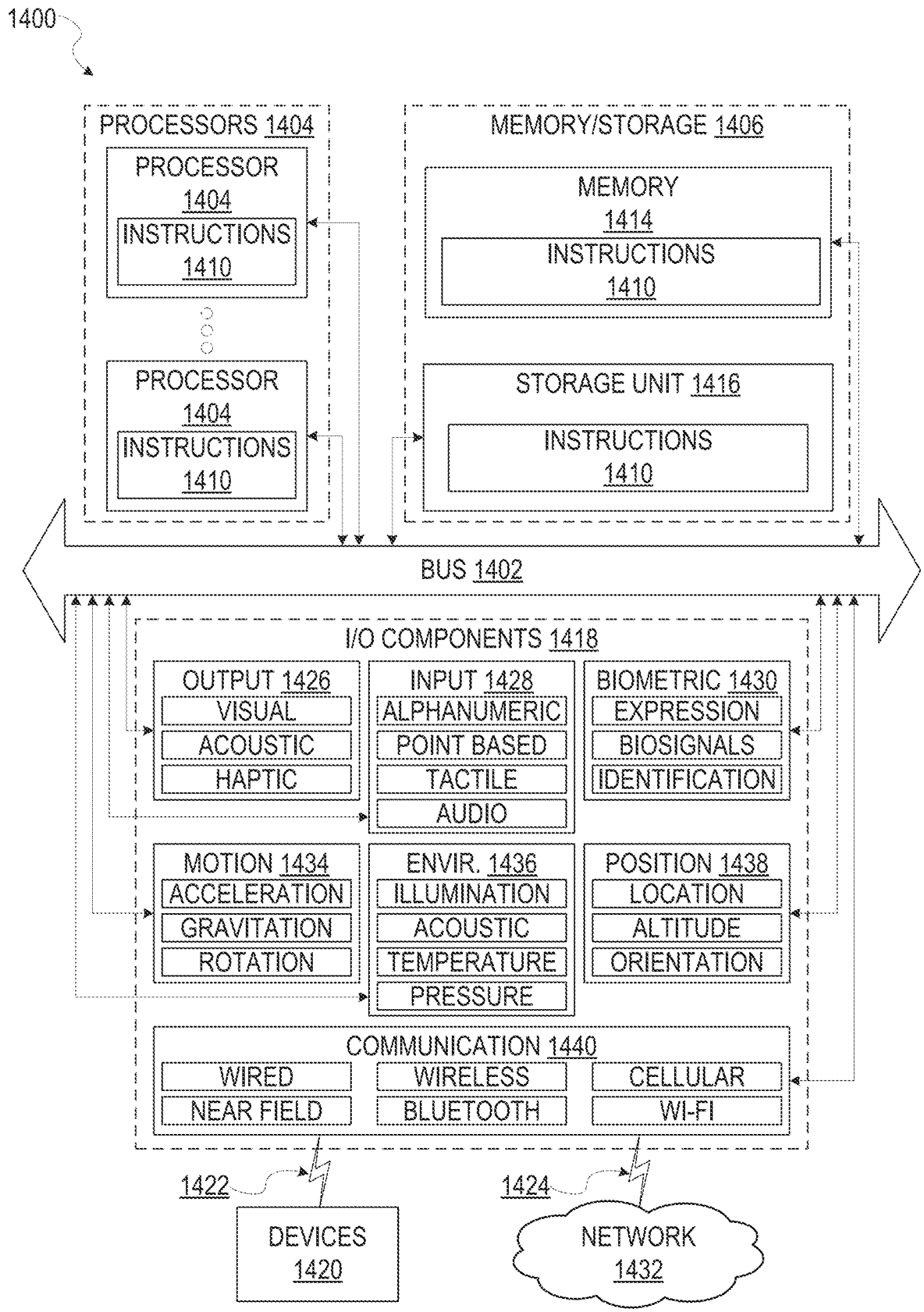
FIG. 14 is a block diagram illustrating an example of components of a machine.

FIG. 14 is a block diagram illustrating an example of components (also referred to herein as "modules") of a machine 1400. In some aspects, the machine is configured to read instructions from a machine-readable medium (e.g., a machine-readable storage medium) and perform any one or more of the methodologies discussed herein. Specifically, FIG. 11 shows a diagrammatic representation of the machine 1400 in the example form of a computer system, within which instructions 1410 (e.g., software; a program, an application, an applet, an app, or other executable code) for causing the machine 1400 to perform any one or more of the methodologies discussed herein may be executed. As such, the instructions 1410 may be used to implement modules or components described herein. The instructions 1410 transform the general, non-programmed machine 1400 into a particular machine 1400 programmed to carry out the described and illustrated functions in the manner described. In alternative embodiments, the machine 1400 operates as a standalone device or may be coupled (e.g., networked) to other machines. In a networked deployment; the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by machine 1400. Further, while only a single machine 1400 is illustrated, the term "machine" shall also be taken to include a collection of machines that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of the processors 1404 are examples of machine-readable media.

As used herein, the term "machine-readable medium," "computer-readable medium," or the like may refer to any component, device, or other tangible medium able to store instructions and data temporarily or permanently. Examples of such media may include, but are not limited to, random-access memory (RAM), read-only memory (ROM), buffer memory, flash memory, optical media, magnetic media, cache memory, other types of storage (e.g., Electrically Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" may also be taken to include any, medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes transitory signals per se.

The I/O components 1418 may include a wide variety of components to provide a user interface for receiving input, providing output, producing output, transmitting information, exchanging information, capturing measurements, and so on. The specific I/O components 1418 that are included in the user interface of a particular machine 1400 will depend on the type of machine. For example, portable machines such as mobile phones will likely include a touch input device or other such input mechanisms, while a headless server machine will likely not include such a touch input device. It will be appreciated that the I/O) components 1418 may include many other components that are not shown in FIG. 11. The I/O components 1418 are grouped according to functionality merely for simplifying the following discussion and the grouping is in no way limiting. In various embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like. The input components 1428 may also include one or more image-capturing devices, such as a digital camera for generating digital images and/or video.

In further embodiments, the I/O components 1418 may include biometric components 1430, motion components 1434, environment components 1436, or position components 1438, as well as a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 may include acceleration sensor components (e.g., accelerometer), gravitation sensor components, rotation sensor components (e.g., gyroscope), and so forth. The environment components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1438 may include location sensor components (e.g., a UPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via a coupling 1424 and a coupling 1422 respectively. For example, the communication components 1440 may include a network interface component or other suitable device to interface with the network 1432. In further examples, the communication components 1440 may include wired communication components, wireless communication components, cellular communication components, Near Field. Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (UM) tag reader components, NFC smart tag detection components, optical reader components (e.g., an optical sensor to detect one-dimensional bar codes such as Universal Product Code (UPC) bar code, multi-dimensional bar codes such as Quick Response (QR code, Aztec code, Data Matrix, Dataglyph, MaxiCode, PDF4111, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geo-location, location via Wi-Fi® signal triangulation, location via detecting an NFC beacon signal that may indicate a particular location, and so forth.

Where a phrase similar to "at least one of A, B, or C," "at least one of A, B, and C," "one or more of A, B, or C," or "one or more of A, B, and C" is used, it is intended that the phrase be interpreted to mean that A alone may be present in an embodiment, B alone may be present in an embodiment, C alone may be present in an embodiment, or any combination of the elements A, B, and C may be present in a single embodiment; for example, A and B, A and C, B and C, or A and B and C may be present.

Changes and modifications may be made to the disclosed embodiments without departing from the scope of the present disclosure. These and other changes or modifications are intended to be included within the scope of the present disclosure, as expressed in the following claims.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document:

We claim:

1. A method comprising:
   determining, by one or more electronic hardware processors, placement of an item within an image;
   displaying the image, by the one or more electronic hardware processors; and
   modifying, by the one or more electronic hardware processors, the item to have a texture resembling a water region or a sky region of the image, the item being modified to have the texture resembling an attribute of the sky region in response to determining that the item was placed within the sky region.

2. The method of claim 1, further comprising modifying the item to have the texture resembling an attribute of the water region.

3. The method of claim 1, wherein the item comprises a sticker, and further comprising:
invoking a classifier trained to segment an image into the sky region and a non-sky region.

4. The method of claim 1, wherein prior to modifying the item, determining that the item has dissimilar visual properties than the texture of the water or sky region, and wherein modifying the item comprises generating a cloud-like texture based on fractal Brownian motion.

5. The method of claim 1, wherein modifying the item further comprises:
generating a grayscale version of the item;
blurring the grayscale version of the item; and
multiplying pixels of the blurred version of the item and pixels of a cloud-like texture to modify the item to have the cloud-like texture.

6. The method of claim 1, further comprising refraining from modifying the item in response to the item being outside a specified region of the image.

7. The method of claim 1, wherein the image is defined by image data and the item is defined by item data separate from the image data, and wherein the item is a colored emoji.

8. The method of claim 1, further comprising:
overlaying the modified item on the image at a determined location based on item location information.

9. The method of claim 1, further comprising:
determining a specified region of the image, the item being placed within the specified region of the image.

10. The method of claim 9, wherein the item is modified in response to determining placement of the item within the specified region of the image, the item being modified based on an attribute of the specified region.

11. The method of claim 9, wherein the texture of the item is modified to resemble a texture of the specified region.

12. An apparatus comprising:
one or more hardware processors; and
a hardware memory, operably connected to the one or more hardware processors, and storing instructions that when executed by one or more hardware processors, perform operations comprising:
determining placement of an item within an image;
modifying the item to have a texture resembling a water region or a sky region of the image; and
displaying the image, the item being modified to have the texture resembling an attribute of the sky region in response to determining that the item was placed within the sky region.

13. The apparatus of claim 12, wherein modifying the item further comprises:
modifying the item to have the texture resembling an attribute of the water region.

14. The apparatus of claim 12, further comprising operations for:
invoking a classifier trained to segment an image into the sky region and a non-sky region.

15. The apparatus of claim 12, wherein prior to modifying the item, the item has a different visual property and texture than the texture of the water or sky region, and wherein the operations for modifying the item comprise operations for generating a cloud-like texture based on fractal Brownian motion.

16. The apparatus of claim 12, wherein the operations for modifying the item further comprise operations for:
generating a grayscale version of the item;
blurring the grayscale version of the item; and
multiplying pixels of the blurred version of the item and pixels of a cloud-like texture to modify the item to have the cloud-like texture.

17. The apparatus of claim 12, further comprising operations for:
determining a specified region of the image, the item being placed within the specified region of the image, wherein the item is modified in response to determining placement of the item within the specified region of the image, the item being modified based on an attribute of the specified region, and wherein the texture of the item is modified to resemble a texture of the specified region.

18. A non-transitory computer-readable medium comprising non-transitory computer readable instructions that, when executed by one or more processors, cause the one or more processors to perform operations comprising:
determining placement of an item within an image;
modifying the item to have a texture resembling a water region or a sky region of the image; and
displaying the image, the item being modified to have the texture resembling an attribute of the sky region in response to determining that the item was placed within the sky region.

19. The non-transitory computer-readable medium of claim 18, wherein prior to modifying the item, the operations comprising determining that the item has dissimilar visual properties than the texture of the water or sky region, and wherein modifying the item comprises generating a cloud-like texture based on fractal Brownian motion.

20. The non-transitory computer-readable medium of claim 18, the operations comprising invoking a classifier trained to segment an image into the sky region and a non-sky region.

* * * * *